(12) United States Patent
Lo

(10) Patent No.: US 11,185,195 B2
(45) Date of Patent: Nov. 30, 2021

(54) ADJUSTABLE TEMPERATURE TREATMENT ASSEMBLY

(71) Applicant: Chih-Fang Lo, Taichung (TW)

(72) Inventor: Chih-Fang Lo, Taichung (TW)

(*) Notice: Subject to any disclaimer, the term of this patent is extended or adjusted under 35 U.S.C. 154(b) by 213 days.

(21) Appl. No.: 16/697,208

(22) Filed: Nov. 27, 2019

(65) Prior Publication Data
US 2021/0153698 A1 May 27, 2021

(51) Int. Cl.
*A47K 3/28* (2006.01)
*B05B 1/18* (2006.01)
*G05D 3/10* (2006.01)
*H05B 1/02* (2006.01)

(52) U.S. Cl.
CPC ............... *A47K 3/288* (2013.01); *B05B 1/18* (2013.01); *G05D 3/10* (2013.01); *H05B 1/0283* (2013.01)

(58) Field of Classification Search
CPC ......... A47K 3/288; B05B 1/18; H05B 1/0283
USPC ............................................................ 4/615
See application file for complete search history.

(56) References Cited

U.S. PATENT DOCUMENTS

| | | | | |
|---|---|---|---|---|
| 3,737,107 A * | 6/1973 | Wright | ...................... | E03C 1/06 239/588 |
| 4,360,159 A * | 11/1982 | Haynes | ................... | E03C 1/066 239/282 |
| 8,347,425 B2 * | 1/2013 | Bronstein | ............... | E03C 1/063 4/605 |
| 8,978,175 B2 * | 3/2015 | Bronstein | ............... | E03C 1/066 4/601 |

* cited by examiner

*Primary Examiner* — Huyen D Le

(57) ABSTRACT

An adjustable temperature treatment assembly includes a top seat and a bottom seat respectively connected to the wall in a shower stall. Two guided rods are connected between the top seat and the bottom seat. An up-and-down unit includes a threaded rod connected between the top seat and the bottom seat, a movable seat connected to the threaded rod, a rotary member, a holding member and a first driving member. The holding member is connected to the rotary member. A warm-hot water unit includes a heating box, and a shower head which is connected to a holding member. A control unit is electrically connected to the first driving member to spin the threaded rod to move the movable seat up and down. A driving member is controlled by the control unit to swing the rotary member together with the shower head left and right.

10 Claims, 10 Drawing Sheets

ADJUSTABLE TEMPERATURE TREATMENT ASSEMBLY

BACKGROUND OF THE INVENTION

1. Fields of the Invention

The present invention relates to an adjustable temperature treatment assembly, and more particularly, to an adjustable temperature treatment assembly with an adjustable shower head or dryer so as to warm up different body portions.

2. Descriptions of Related Art

One of conventional treatment methods known to applicant is to provide heat to desired body portions to enhance blood circulation, and some research show that the immune system is improved five to six times of work efficiency when the body temperature increases one degree. On the contrary, when the body temperature drops one degree, the immune system becomes weaker about 40%. Therefore, a temperature adjustable wearable device is developed and provides multiple hot spots to warm up the wearer's body. However, the user has to remove his/her clothes and wears the temperature adjustable wearable device to allow the hot spots directly contact the skin. For some users, such as patients or disables, it is difficult to wear the temperature adjustable wearable device by themselves. However, if the user's skin contacts the hot spots of high temperature may cause dangerous result, so that how to properly control the use the hot spots to avoid from causing skin injury is important.

The present invention is intended to provide an adjustable temperature treatment assembly which may include an adjustable shower head or a dryer which can be controlled to move or swing, and the temperature of the water from the shower head or the dryer can be controlled so as to eliminate the drawbacks mentioned above.

SUMMARY OF THE INVENTION

The present invention relates to an adjustable temperature treatment assembly and comprises a shower stall having an entrance, and a top seat and a bottom seat are respectively connected to a wall in the shower stall. Two guided rods are connected between the top seat and the bottom seat. An up-and-down unit includes a threaded rod connected between the top seat and the bottom seat, and a movable seat including multiple bores and a threaded hole. The two guide rods extend through the bores, and the threaded rod threadedly extends through the threaded hole of the movable seat. The movable seat moves along the two guide rods by spinning the threaded rod. A first driving member is connected to the top seat and connected to the threaded rod so as to spin the threaded rod to move the movable seat up and down. A rotary member is connected to the movable seat and connected to a second driving member. The second driving member drives the rotary member to swing left and right. A holding member is connected to the rotary member and has a recess. A warm-hot water unit includes a heating box which is connected to the top seat. A first hose is connected between the heating box and a water source. A second hose is connected between the heating box and a shower head. The shower head is engaged with the recess of the holding member. A control unit is electrically connected to the first driving member, the heating box and the second driving member. The first driving member is controlled by the control unit to spin the threaded rod to move the movable seat up and down. The second driving member is controlled by the control unit to drive the rotary member to swing left and right, such that the holding member and the shower head swing left and right.

Preferably, the holding member includes a third driving member which is electrically connected to the control unit. The third driving member is controlled by the control unit to drive the holding member to swing up and down.

Preferably, the first, second and third driving members are servo motors.

Preferably, the control unit is connected to the shower stall and located close to the entrance. The control unit includes two temperature buttons, two up-and-sown buttons, two swing buttons, two speed buttons, a memory buttons, an adjustment button and a pause button. The two temperature buttons are configured to control the water temperature in the heating box. The two up-and-sown buttons are configured to control the first driving member to move the movable seat. The two swing buttons are configured to control the speed of the holding member to swing up and down. The two speed buttons are configured to control the speed of the rotary member to swing left and right. The memory button is configured to form a memory mold to memorize adjustment results of the two temperature buttons, the two up-and-sown buttons, the two swing buttons and the two speed buttons. The adjustment button is configured to cancel the memory mold and to switch the memory mold to an adjustment mold. The pause button is configured to pause the control unit.

Preferably, a motor is electrically connected to the control unit and connected to the hose that is connected to the shower head so as to increase water pressure from the shower head. The heating box includes a display screen for displaying water temperature.

Preferably, the control unit includes a transmission member which electrically communicates with a mobile phone, and applications that are downloaded to the mobile phone. The applications downloaded to the mobile phone control operation of the first, second and third driving members, and memorize body specifications of users to have a custom-use mold.

The present invention also provide another adjustable temperature treatment assembly that comprises a shower stall having an entrance. A top seat and a bottom seat are respectively connected to a wall in the shower stall. Two guided rods are connected between the top seat and the bottom seat. An up-and-down unit includes a threaded rod which is connected between the top seat and the bottom seat. A movable seat includes multiple bores and a threaded hole. The two guide rods extend through the bores. The threaded rod threadedly extends through the threaded hole of the movable seat. The movable seat moves along the two guide rods by spinning the threaded rod. A first driving member is connected to the top seat and connected to the threaded rod so as to spin the threaded rod to move the movable seat up and down. A rotary member is connected to the movable seat and connected to a second driving member. The second driving member drives the rotary member to swing left and right. A holding member is connected to the rotary member and has a recess. A dryer has a handle which is engaged with the recess of the holding member. A control unit is electrically connected to the first driving member, the dryer and the second driving member. The dryer is controlled by the control unit to output air of different temperatures. The first driving member is controlled by the control unit to spin the threaded rod to move the movable seat up and down. The second driving member is controlled by the control unit to drive the rotary member to swing left and right, such that the holding member and the dryer swing left and right.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
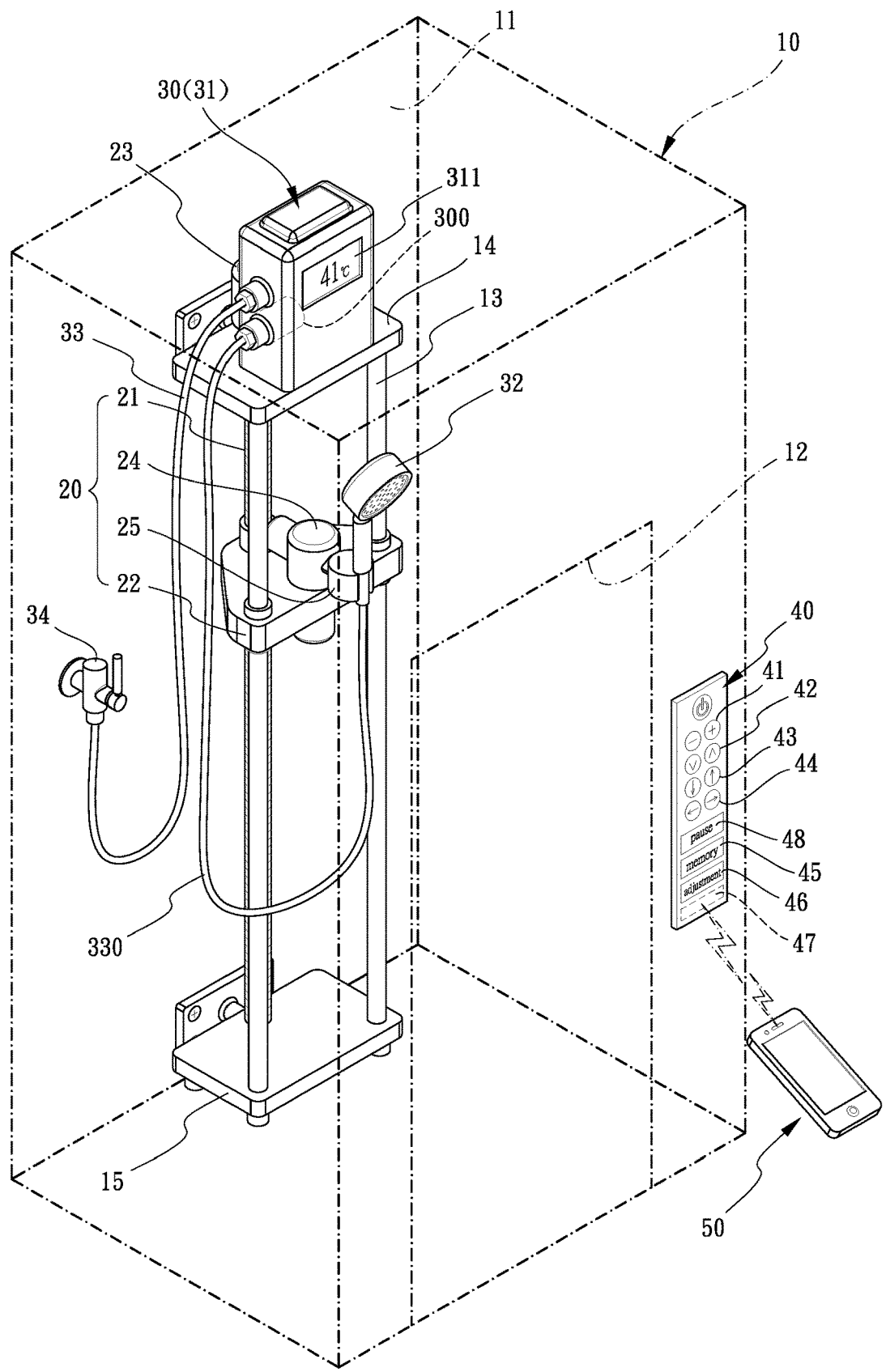
FIG. 1 illustrates the adjustable temperature treatment assembly of the present invention.

Referring to FIGS. 1 to 8, the adjustable temperature treatment assembly of the present invention comprises a shower stall 10 having an entrance 12, and a top seat 14 and a bottom seat 15 are respectively connected to a wall 11 located in the shower stall 10 at a proper distance. Two guided rods 13 are connected between the top seat 14 and the bottom seat 15.

An up-and-down unit 20 includes a threaded rod 21 which is connected between the top seat 14 and the bottom seat 15. A movable seat 22 includes multiple bores 221 and a threaded hole 222. The two guide rods 13 extend through the bores 221, and the threaded rod 21 threadedly extends through the threaded hole 222 of the movable seat 22, so that the movable seat 22 moves along the two guide rods 13 by spinning the threaded rod 21 to adjust the height of the movable seat 22. A first driving member 23 is connected to the top seat 14 and connected to the threaded rod 21 so as to spin the threaded rod 21 to move the movable seat 22 up and down. A rotary member 24 is connected to the movable seat 22 and connected to a second driving member 241, such that the second driving member 241 drives the rotary member 24 to swing left and right. A holding member 25 is connected to the rotary member 24 and has a recess 252.

A warm-hot water unit 30 includes a heating box 31 which is connected to the top seat 14. A first hose 33 is connected between the heating box 31 and a water source 34 from which water is provided to the heating box 31. A second hose 330 is connected between the heating box 31 and a shower head 32, wherein the shower head 32 is engaged with the recess 252 of the holding member 25. The heating box 31 heat the water to be used from the shower head 32.

Figure 2:
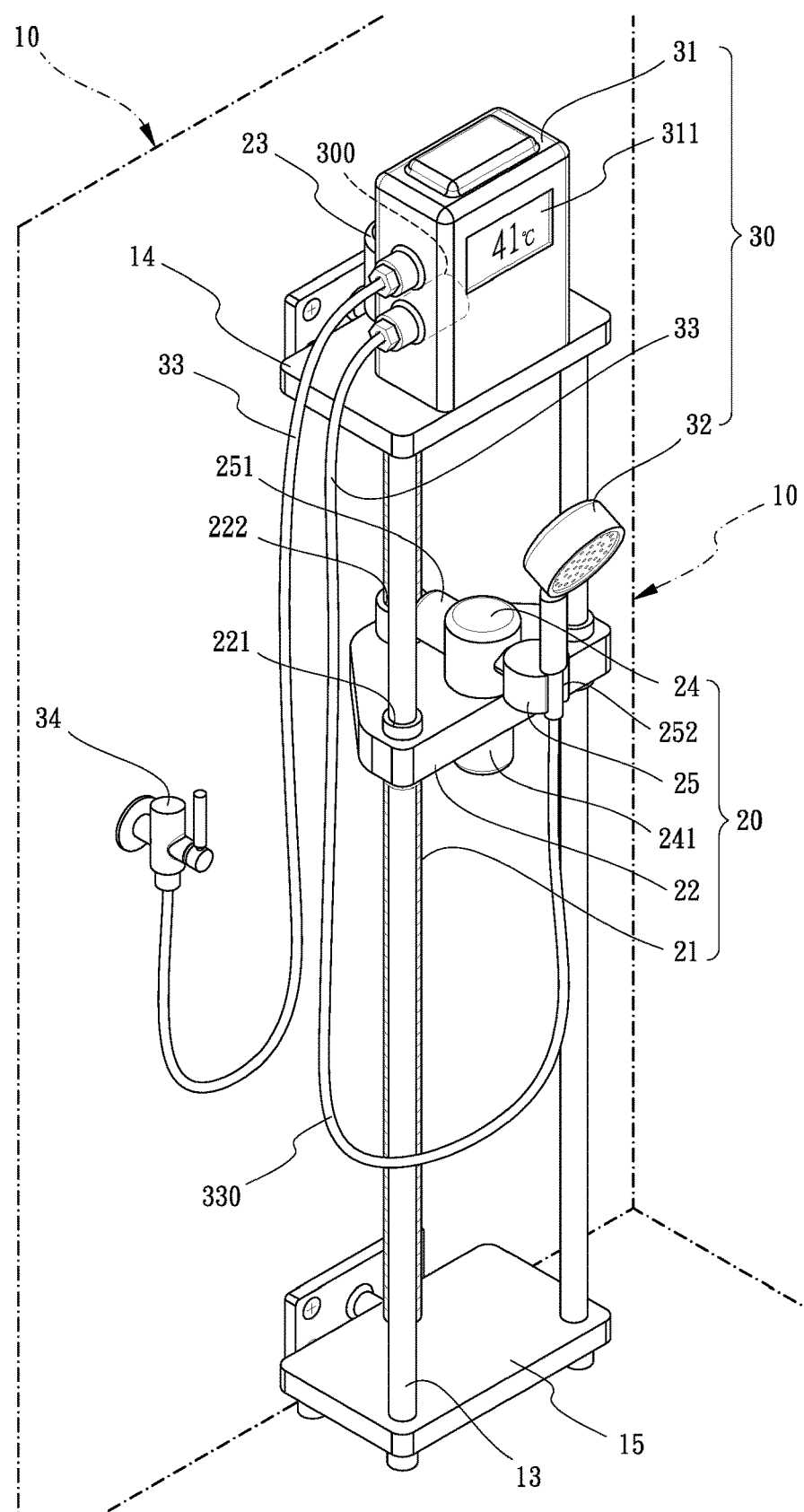
FIG. 2 shows the up-and-down unit, the warm-hot water unit of the adjustable temperature treatment assembly of the present invention.
Figure 3:
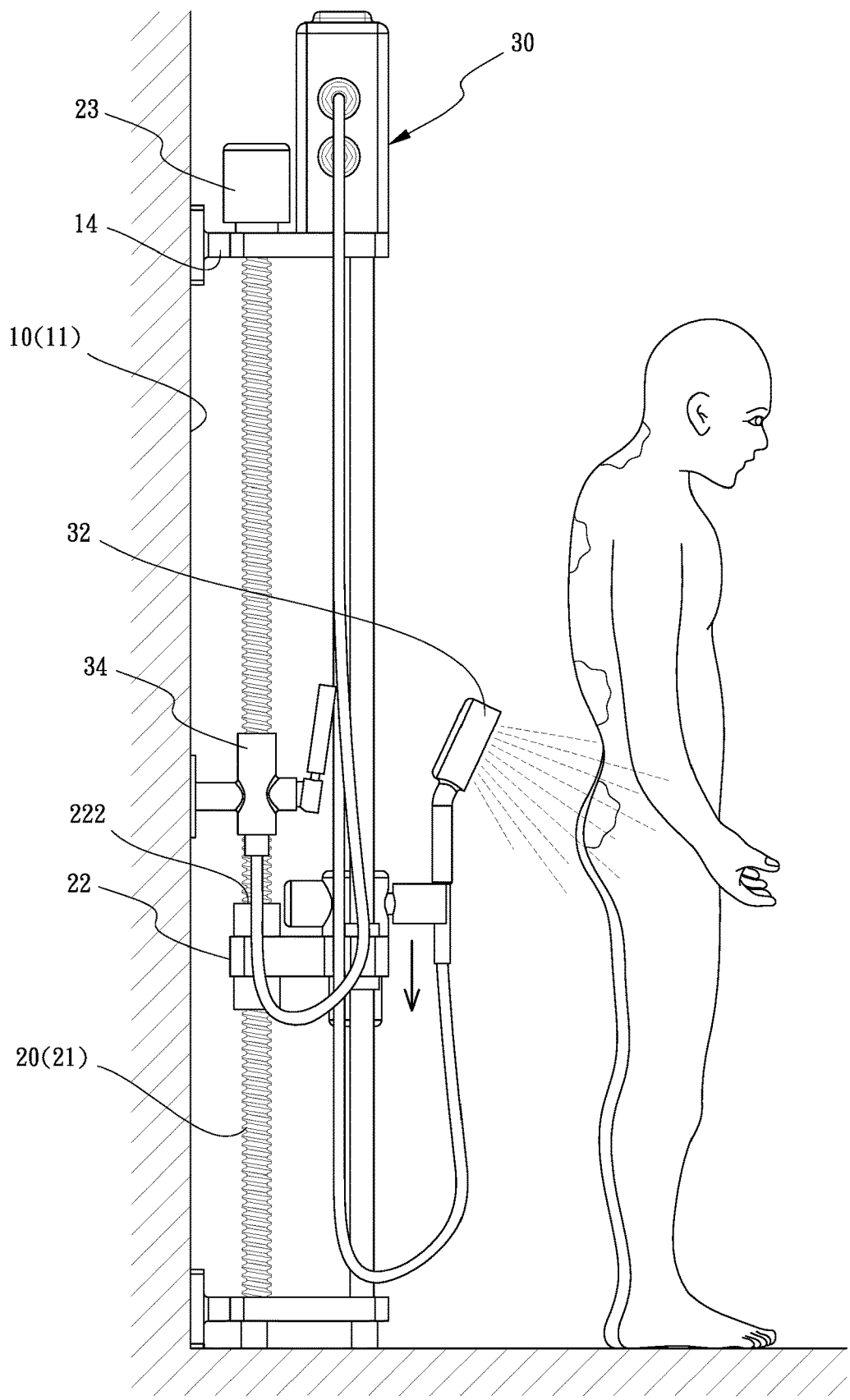
FIG. 3 illustrates one of the positions of the shower head of the adjustable temperature treatment assembly of the present invention.
Figure 4:
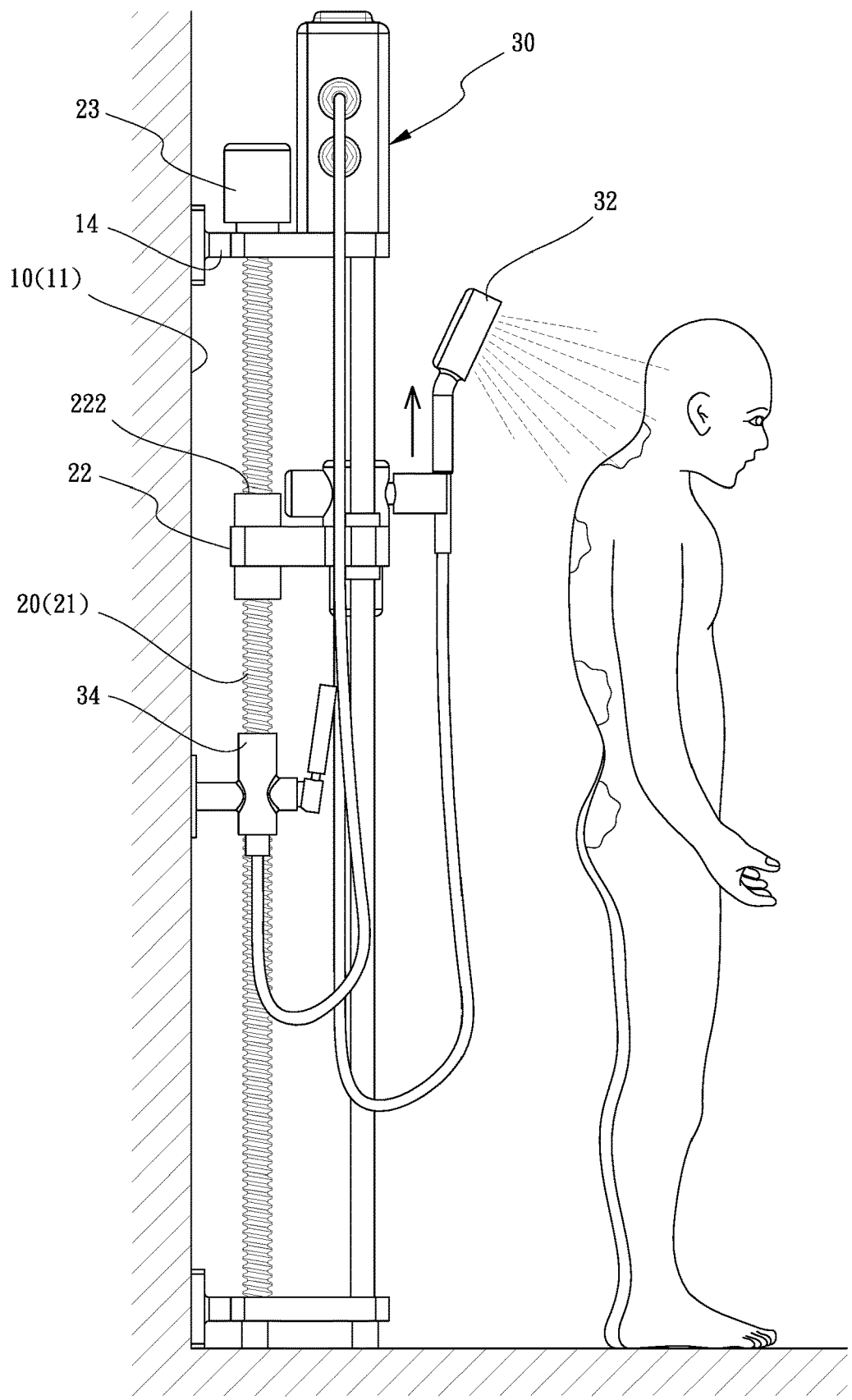
FIG. 4 illustrates another one of the positions of the shower head of the adjustable temperature treatment assembly of the present invention.
Figure 5:
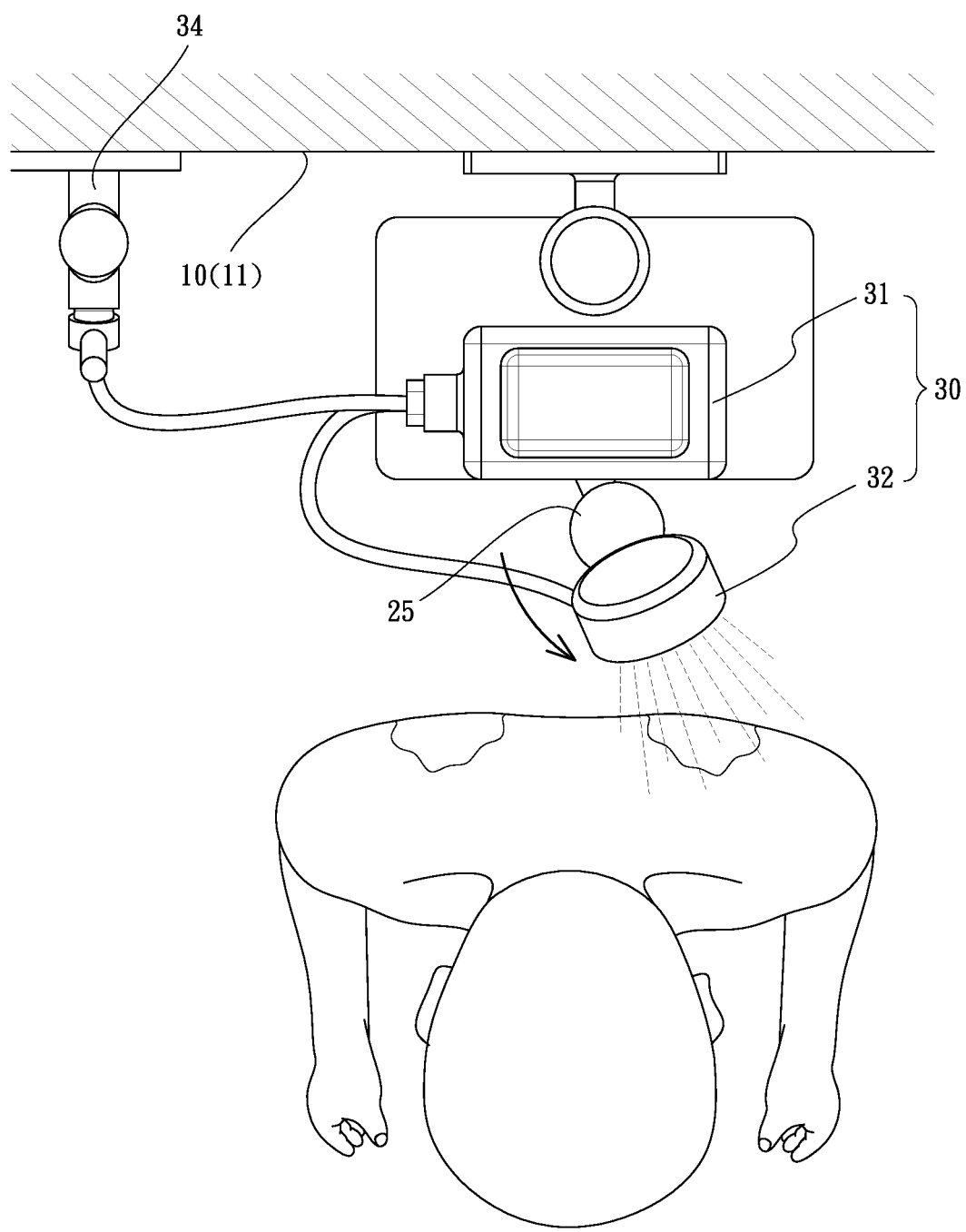
FIG. 5 is a top view to show that the shower head of the adjustable temperature treatment assembly of the present invention swings to the left of the user's body.
Figure 6:
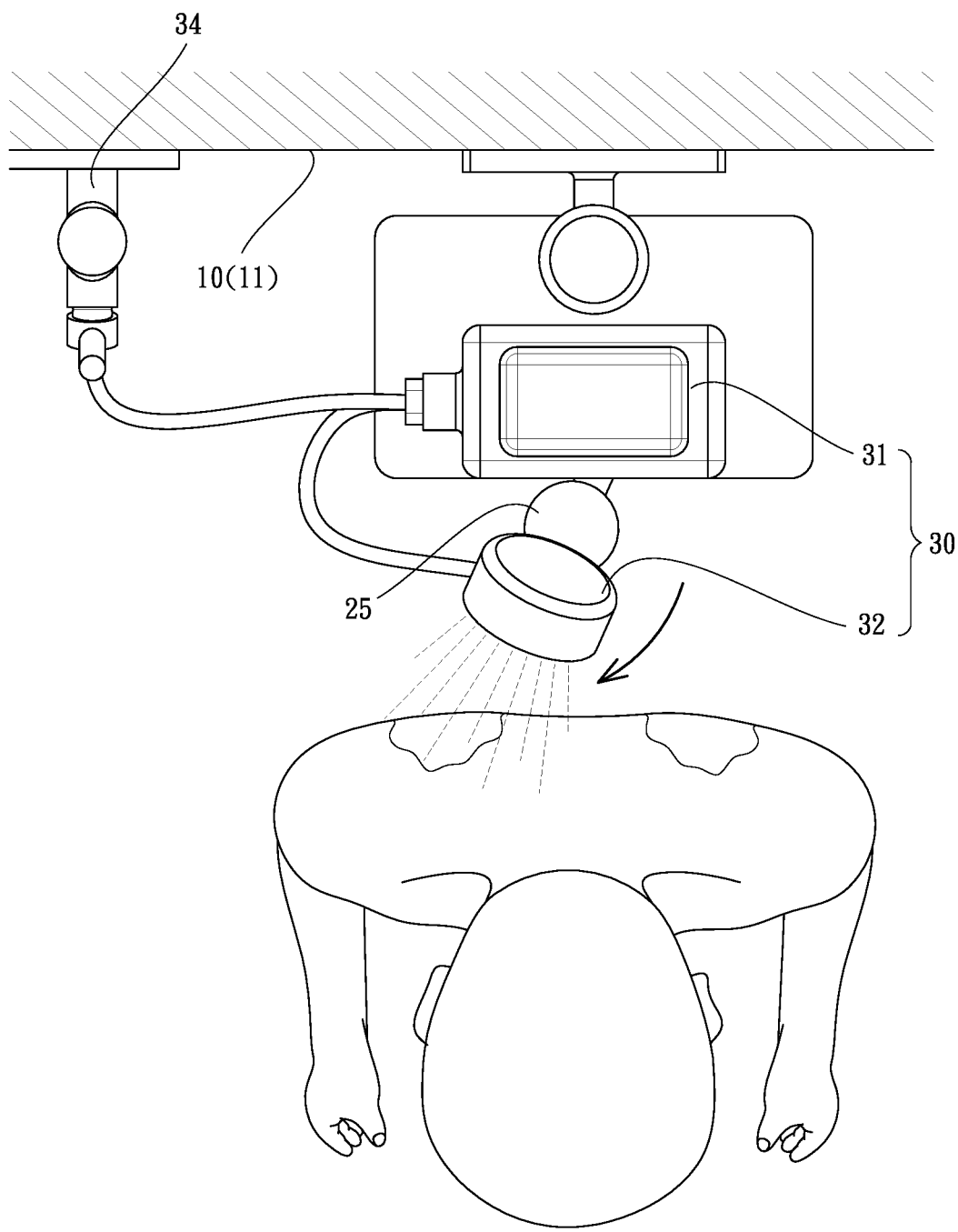
FIG. 6 is a top view to show that the shower head of the adjustable temperature treatment assembly of the present invention swings to the right of the user's body.

A control unit 40 is electrically connected to a power source (not shown), the first driving member 23, the heating box 31 and the second driving member 241. The first driving member 23 is controlled by the control unit 40 to spin the threaded rod 21 to move the movable seat 22 up and down. The second driving member 241 is controlled by the control unit 40 to drive the rotary member 24 to swing left and right, such that the holding member 25 and the shower head 32 swing left and right. Therefore, the shower head 32 outputs warm or hot water and can be adjusted to be positioned at different heights, and can swing left and right. As shown in FIGS. 2, 3 and 4, by spinning the threaded rod 21, the movable seat 22 is moved up and down along the two guide rods 13 to provide warm or hot water to different body portions of the user. As shown in FIGS. 5 and 6, the second driving member 241 is controlled by the control unit 40 to drive the rotary member 24 to swing left and right, such that the holding member 25 and the shower head 32 swing left and right.

Figure 7:
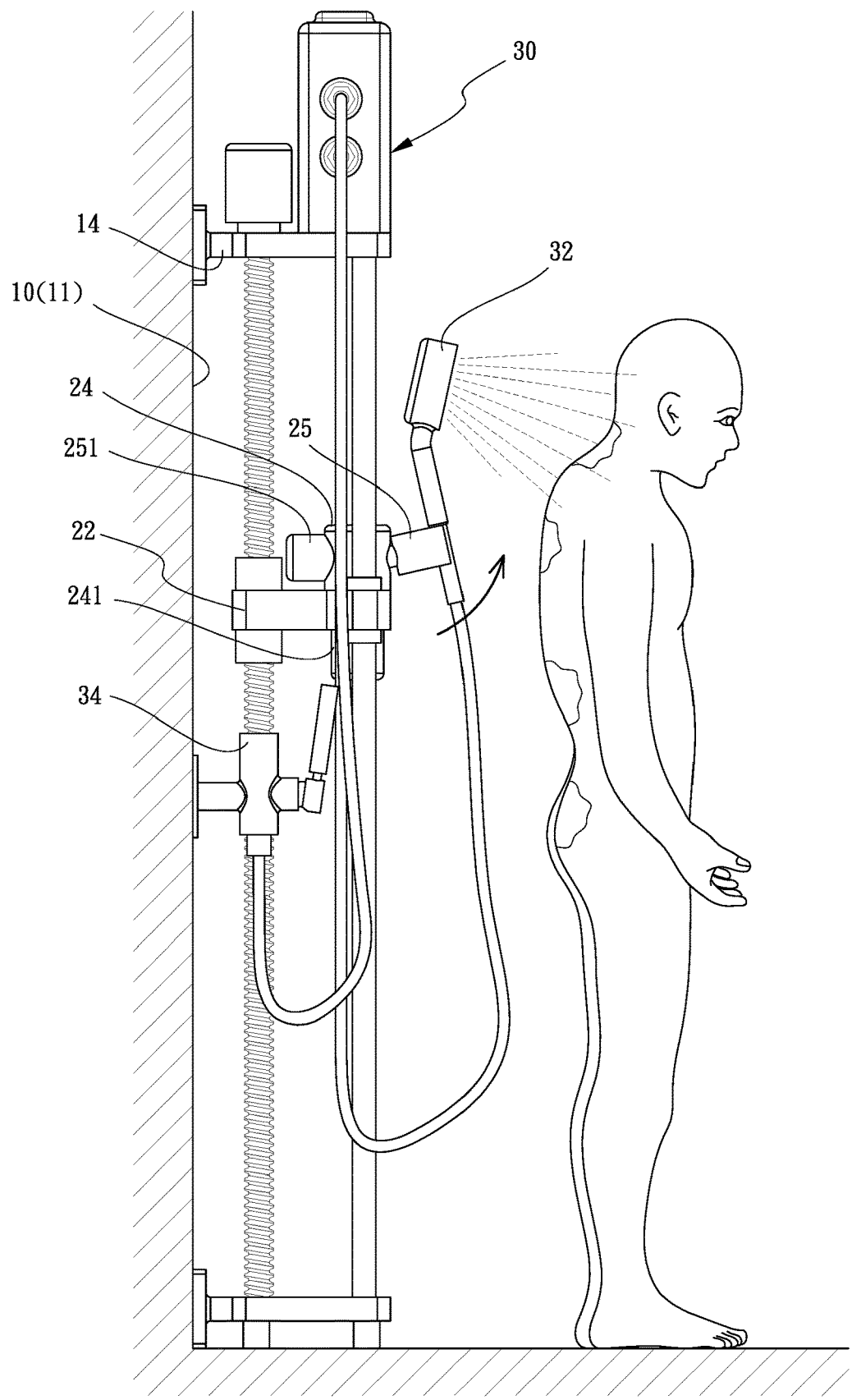
FIG. 7 shows that the holding member of the adjustable temperature treatment assembly of the present invention swings upward.
Figure 8:
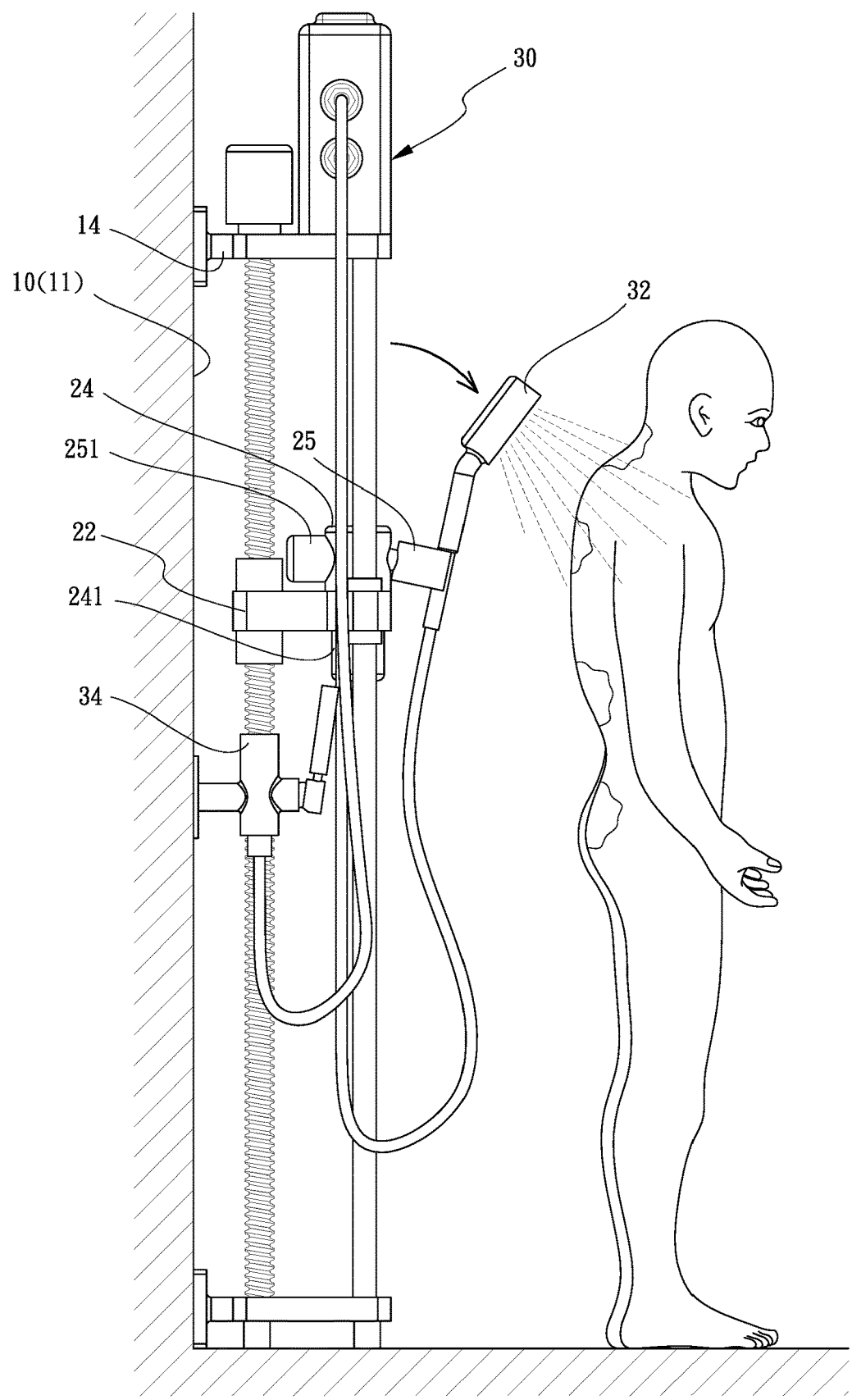
FIG. 8 shows that the holding member of the adjustable temperature treatment assembly of the present invention swings downward.

As shown in FIGS. 1, 7 and 8, the holding member 25 includes a third driving member 251 which is electrically connected to the control unit 40. The third driving member 251 is controlled by the control unit 40 to drive the holding member 25 to swing up and down. In this embodiment, the first, second and third driving members 23, 241, 251 are servo motors. The first, second and third driving members 23, 241, 251 respectively uses the respective output shaft thereof to drive the threaded rod 21, the rotary member 24 and the holding member 25.

The control unit 40 is connected to the shower stall 10 and located close to the entrance 12. The control unit 40 includes two temperature buttons 41, two up-and-sown buttons 42, two swing buttons 43, two speed buttons 44, a memory buttons 45, an adjustment button 46 and a pause button 48. The two temperature buttons 41 are configured to control water temperature in the heating box 31. The two up-and-sown buttons 42 are configured to control the first driving member 23 to move the movable seat 22. The two swing buttons 43 are configured to control the speed of the holding member 25 to swing up and down. The two speed buttons 44 are configured to control the speed of the rotary member 24 to swing left and right. The memory button 45 is configured to form a memory mold to memorize adjustment results of the two temperature buttons 41, the two up-and-sown buttons 42, the two swing buttons 43 and the two speed buttons 44. In other words, the height of the user's waist, shoulders, neck, can be memorized. The adjustment button 46 is configured to cancel the memory mold and to switch the memory mold to an adjustment mold. The pause button 48 is configured to pause or stop the control unit 40 by shutting off the electric power.

Furthermore, a motor 300 is electrically connected to the control unit 40 and the hose 330 that is connected to the shower head 32 so as to increase water pressure from the shower head 32 to provide massage feature. The heating box 31 includes a display screen 311 for displaying water temperature.

As shown in FIG. 1, the control unit 40 includes a transmission member 47 which electrically communicates with a mobile phone 50, and applications (APP) that are downloaded to the mobile phone 50. The applications downloaded to the mobile phone 50 control operation of the first, second and third driving members 23, 241, 251, and memorize body specifications of users to have a custom-use mold.

Figure 9:
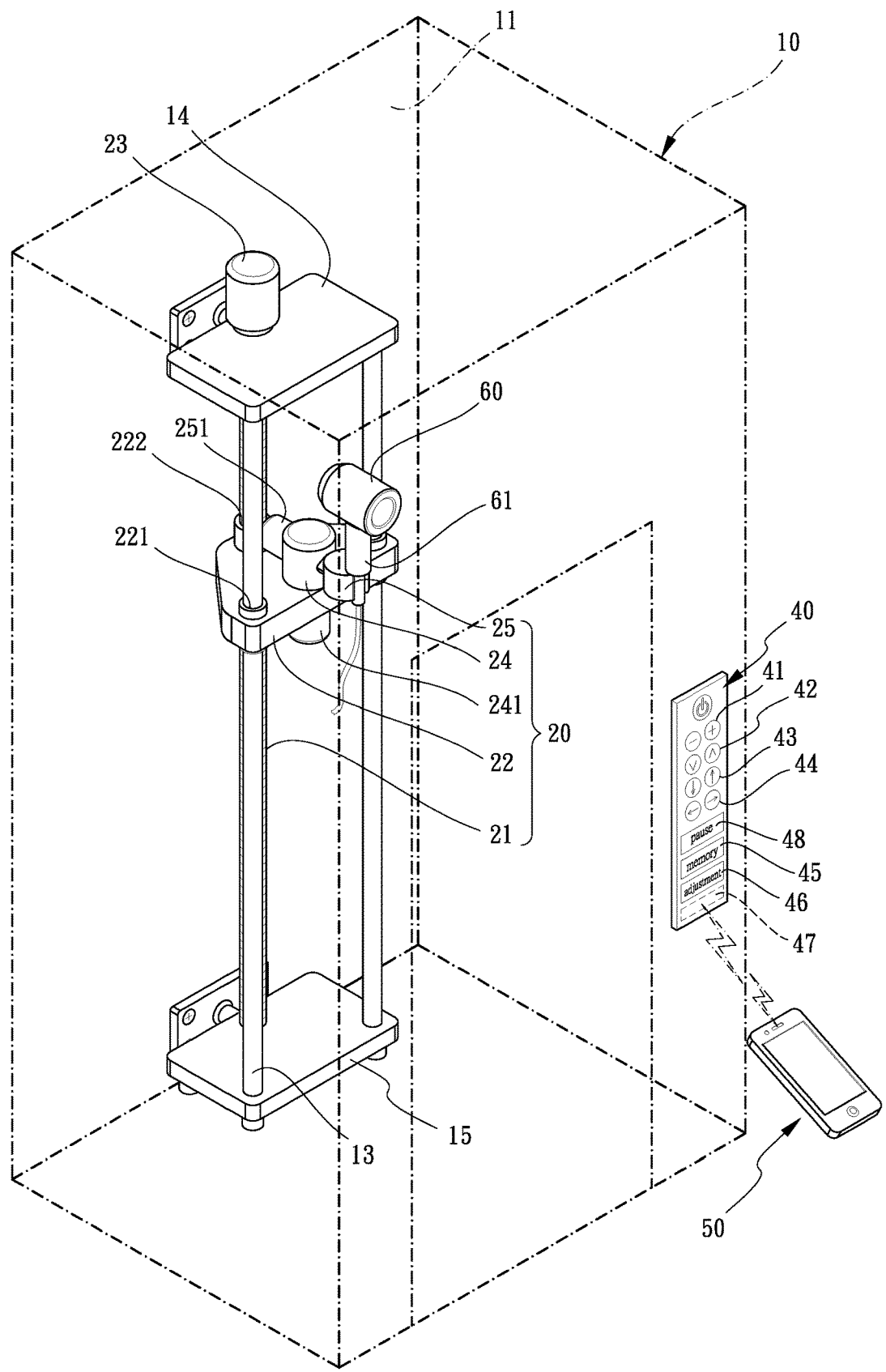
FIG. 9 illustrates another embodiment of the adjustable temperature treatment assembly of the present invention.
Figure 10:
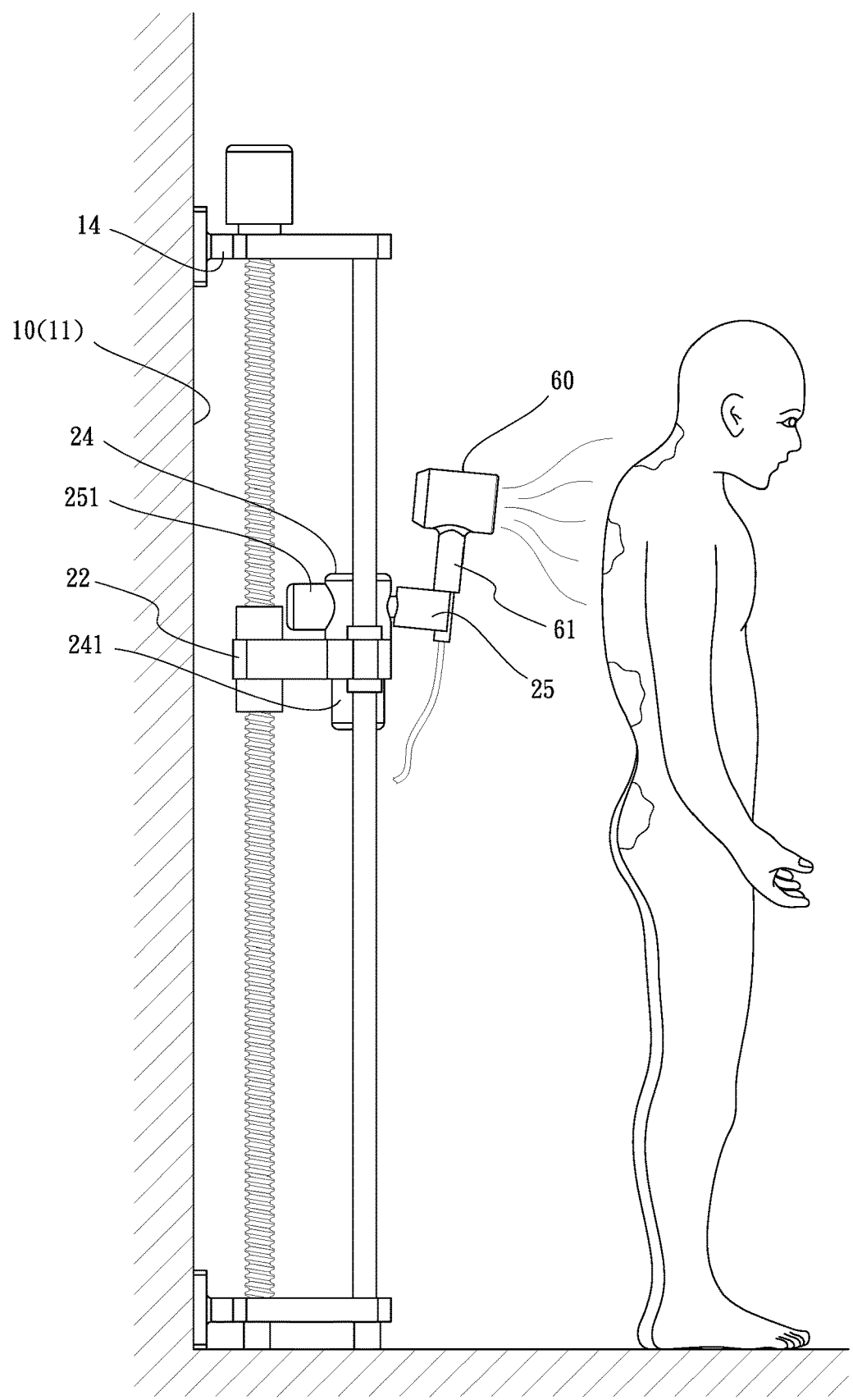
FIG. 10 illustrates the use of the dryer of the embodiment shown in FIG. 9.

FIGS. 9 and 10 illustrate a second embodiment of the adjustable temperature treatment assembly of the present invention, wherein the warm-hot water unit 30 in the first embodiment is replaced by a dryer 60. That is to say, the second embodiment comprises a shower stall having an entrance. A top seat 14 and a bottom seat 15 are respectively connected to a wall 11 located in the shower stall 10, and two guided rods 13 are connected between the top seat 14 and the bottom seat 15.

An up-and-down unit 20 includes a threaded rod 21 which is connected between the top seat 14 and the bottom seat 15. A movable seat 22 includes multiple bores 221 and a threaded hole 222. The two guide rods 13 extend through the bores 221, and the threaded rod 21 threadedly extends through the threaded hole 222 of the movable seat 22. The movable seat 22 moves along the two guide rods 13 by spinning the threaded rod 21. A first driving member 23 is connected to the top seat 14 and connected to the threaded rod 21 so as to spin the threaded rod 21 to move the movable seat 22 up and down. A rotary member 24 is connected to the movable seat 22 and connected to a second driving member 241. The second driving member 241 drives the rotary member 24 to swing left and right. A holding member 25 is connected to the rotary member 24 and includes a recess 252. A dryer 60 has a handle 61 which is engaged with the recess 252 of the holding member 25.

A control unit 40 is electrically connected to a power source (not shown), the first driving member 23, the dryer 60 and the second driving member 241. The dryer 60 is controlled by the control unit 40 to output air of different temperatures. The first driving member 23 is controlled by the control unit 40 to spin the threaded rod 21 to move the movable seat 22 up and down. The second driving member 241 is controlled by the control unit 40 to drive the rotary member 24 to swing left and right, such that the holding member 25 and the dryer 60 swing left and right.

The holding member 25 includes a third driving member 251 which is electrically connected to the control unit 40. The third driving member 251 is controlled by the control unit 40 to drive the holding member 25 to swing up and down so as to prevent the hot air from the dryer 60 burning the user. The first, second and third driving members 23, 241, 251 are servo motors.

The control unit 40 is connected to the shower stall 10 and located close to the entrance 12. The control unit 40 includes two up-and-sown buttons 42, two swing buttons 43, two speed buttons 44, a memory buttons 45, an adjustment button 46 and a pause button 48. The two up-and-sown buttons 42 are configured to control the first driving member 23 to move the movable seat 22. The two swing buttons 43 are configured to control a speed of the holding member 25 to swing up and down. The two speed buttons 44 are configured to control the speed of the rotary member 24 to swing left and right. The memory button 45 is configured to form a memory mold to memorize adjustment results of the two up-and-sown buttons 42, the two swing buttons 43 and the two speed buttons 44. The adjustment button 46 is configured to cancel the memory mold and to switch the memory mold to an adjustment mold. The pause button 48 is configured to pause or stop the control unit 40 by shutting the electric power.

The control unit 40 includes a transmission member 47 which electrically communicates with a mobile phone 50, and applications (APP) that are downloaded to the mobile phone 50. The applications downloaded to the mobile phone 50 control operation of the first, second and third driving members 23, 241, 251, and memorize body specifications of users to have a custom-use mold.

While we have shown and described the embodiment in accordance with the present invention, it should be clear to those skilled in the art that further embodiments may be made without departing from the scope of the present invention.

What is claimed is:

1. An adjustable temperature treatment assembly comprising:
   a shower stall having an entrance, a top seat and a bottom seat adapted to be respectively connected to a wall located in the shower stall, two guided rods connected between the top seat and the bottom seat;
   an up-and-down unit including a threaded rod which is connected between the top seat and the bottom seat, a movable seat including multiple bores and a threaded hole, the two guide rods extending through the bores, the threaded rod threadedly extending through the threaded hole of the movable seat, the movable seat moving along the two guide rods by spinning the threaded rod, a first driving member connected to the top seat and connected to the threaded rod so as to spin the threaded rod to move the movable seat up and down, a rotary member connected to the movable seat and connected to a second driving member, the second driving member driving the rotary member to swing left and right, a holding member connected to the rotary member, a recess defined in the holding member;
   a warm-hot water unit including a heating box which is connected to the top seat, a first hose connected between the heating box and a water source, a second hose connected between the heating box and a shower head, the shower head engaged with the recess of the holding member, and
   a control unit electrically connected to the first driving member, the heating box and the second driving member, the first driving member being controlled by the control unit to spin the threaded rod to move the movable seat up and down, the second driving member being controlled by the control unit to drive the rotary member to swing left and right, such that the holding member and the shower head swing left and right.

2. The adjustable temperature treatment assembly as claimed in claim 1, wherein the holding member includes a third driving member which is electrically connected to the control unit, the third driving member is controlled by the control unit to drive the holding member to swing up and down.

3. The adjustable temperature treatment assembly as claimed in claim 2, wherein the first, second and third driving members are servo motors.

4. The adjustable temperature treatment assembly as claimed in claim 2, wherein the control unit includes a transmission member which electrically communicates with a mobile phone, and applications that are downloaded to the mobile phone, the applications downloaded to the mobile phone control operation of the first, second and third driving members, and memorize body specifications of users to have a custom-use mold.

5. The adjustable temperature treatment assembly as claimed in claim 1, wherein the control unit is connected to the shower stall and located close to the entrance, the control unit includes two temperature buttons, two up-and-sown buttons, two swing buttons, two speed buttons, a memory buttons, an adjustment button and a pause button, the two temperature buttons are configured to control water temperature in the heating box, the two up-and-sown buttons are configured to control the first driving member to move the movable seat, the two swing buttons are configured to control a speed of the holding member to swing up and down, the two speed buttons are configured to control a speed of the rotary member to swing left and right, the memory button is configured to form a memory mold to memorize adjustment results of the two temperature buttons, the two up-and-sown buttons, the two swing buttons and the two speed buttons, the adjustment button is configured to cancel the memory mold and to switch the memory mold to an adjustment mold, the pause button is configured to pause the control unit.

6. The adjustable temperature treatment assembly as claimed in claim 1, wherein a motor is electrically connected to the control unit and connected to the hose that is connected to the shower head so as to increase water pressure from the shower head, the heating box includes a display screen for displaying water temperature.

7. An adjustable temperature treatment assembly comprising:
a shower stall having an entrance, a top seat and a bottom seat adapted to be respectively connected to a wall located in the shower stall, two guided rods connected between the top seat and the bottom seat;
an up-and-down unit including a threaded rod which is connected between the top seat and the bottom seat, a movable seat including multiple bores and a threaded hole, the two guide rods extending through the bores, the threaded rod threadedly extending through the threaded hole of the movable seat, the movable seat moving along the two guide rods by spinning the threaded rod, a first driving member connected to the top seat and connected to the threaded rod so as to spin the threaded rod to move the movable seat up and down, a rotary member connected to the movable seat and connected to a second driving member, the second driving member driving the rotary member to swing left and right, a holding member connected to the rotary member, a recess defined in the holding member;
a dryer having a handle, the handle of the dryer engaged with the recess of the holding member, and
a control unit electrically connected to the first driving member, the dryer and the second driving member, the dryer being controlled by the control unit to output air of different temperatures, the first driving member being controlled by the control unit to spin the threaded rod to move the movable seat up and down, the second driving member being controlled by the control unit to drive the rotary member to swing left and right, such that the holding member and the dryer swing left and right.

8. The adjustable temperature treatment assembly as claimed in claim 7, wherein the holding member includes a third driving member which is electrically connected to the control unit, the third driving member is controlled by the control unit to drive the holding member to swing up and down, the first, second and third driving members are servo motors.

9. The adjustable temperature treatment assembly as claimed in claim 8, wherein the control unit includes a transmission member which electrically communicates with a mobile phone, and applications that are downloaded to the mobile phone, the applications downloaded to the mobile phone control operation of the first, second and third driving members, and memorize body specifications of users to have a custom-use mold.

10. The adjustable temperature treatment assembly as claimed in claim 7, wherein the control unit is connected to the shower stall and located close to the entrance, the control unit includes two up-and-sown buttons, two swing buttons, two speed buttons, a memory buttons, an adjustment button and a pause button, the two up-and-sown buttons are configured to control the first driving member to move the movable seat, the two swing buttons are configured to control a speed of the holding member to swing up and down, the two speed buttons are configured to control a speed of the rotary member to swing left and right, the memory button is configured to form a memory mold to memorize adjustment results of the two up-and-sown buttons, the two swing buttons and the two speed buttons, the adjustment button is configured to cancel the memory mold and to switch the memory mold to an adjustment mold, the pause button is configured to pause the control unit.

\* \* \* \* \*